Smith & Reed.
Bee-Hive.

N°76258. Patented Mar. 31, 1868.

Witnesses:
Theo Tusche
J. A. Service.

Inventor:
A. J. Smith
H. C. Reed
Per Munn & Co.
Attorneys

United States Patent Office.

A. J. SMITH AND H. C. REED, OF DECORAH, IOWA.

Letters Patent No. 76,258, dated March 31, 1868.

IMPROVEMENT IN BEE-HIVES.

The Schedule referred to in these Letters Patent and making part of the same.

TO ALL WHOM IT MAY CONCERN:

Be it known that we, A. J. SMITH and H. C. REED, of Decorah, in the county of Winneshiek, and State of Iowa, have invented a new and useful Improvement in Bee-Hives; and that the following description, taken in connection with the accompanying drawings, hereinafter referred to, forms a full and exact specification of the same, wherein we have set forth the nature and principles of our said improvement, by which our invention may be distinguished from all others of a similar class, together with such parts as we claim, and desire to have secured to us by Letters Patent.

This invention relates to a new and improved means for preventing the frequent swarming of bees, and consequently securing an increased amount of surplus honey from them.

Various plans have been devised to effect this end, such as large hives provided with a plurality of compartments, and so arranged that as one compartment becomes fully occupied, another one may be opened to them. Surplus-honey boxes have also been applied to hives. But no plan has hitherto been successful, owing to the difficulty of getting the bees to work in new compartments or supplemental boxes, and if they commence work in them, a superior quality of honey is not obtained, as the bees, if permitted to swarm, will not commence to work in said compartments or boxes until after swarming-season, and it is during this period that the flowers contain the most abundant supply of sweet juices. If surplus or spare-honey boxes are not used, and the honey taken from the main portion or body of the hive, a very inferior honey is obtained, containing bee-bread, frequently old and sour.

Again, if the bees are permitted to swarm, they frequently leave the premises of the apiariast and are lost. Bees will generally swarm three times, and cause the mother colony to become so much reduced that they frequently perish during the winter, but if they can be prevented from swarming more than once, and then induced, after the first swarming, to work in spare-honey boxes, a good supply of surplus honey may be obtained, and the colony left strong to survive a cold winter.

The object of this invention is to obtain the very desirable result above stated, and to this end our invention consists in the employment or use of a trap and a cage, so arranged that the queen of the first swarm, or any swarm from the mother colony, may be caught and then confined, under the conditions and circumstances hereinafter set forth. In the accompanying sheet of drawings—

Figure 2:
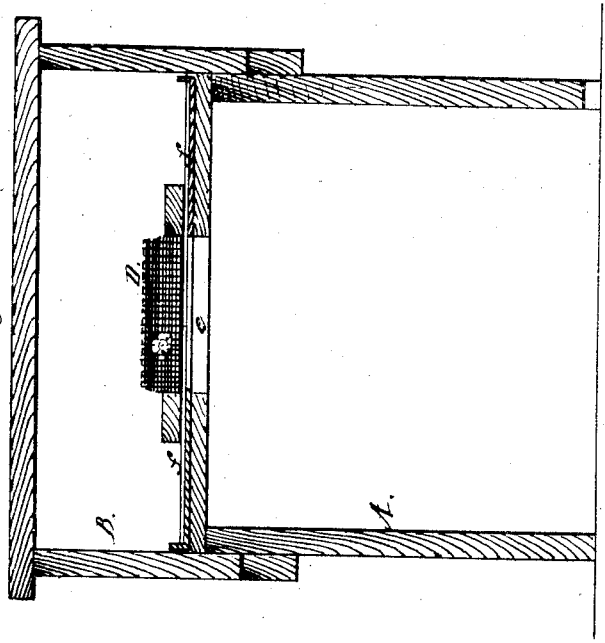
Figure 4:
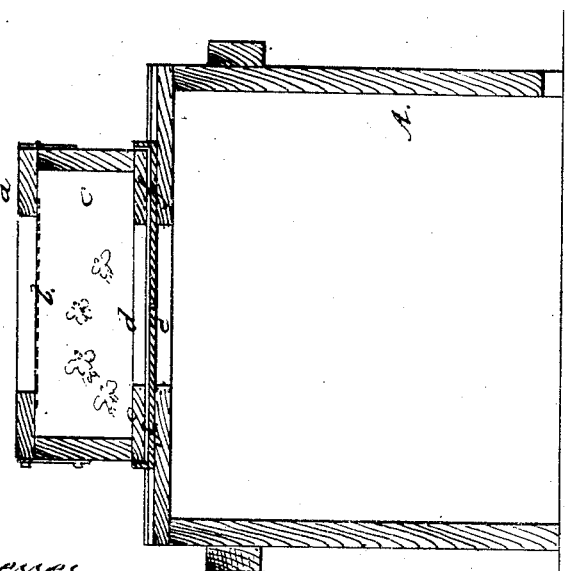

Figures 1 and 2 represent a vertical central section of a bee-hive, showing the manner in which our invention is carried out.

Similar letters of reference indicate like parts.

A represents the body or main portion of the hive, and B, in fig. 2, is the cap or cover of the same, which may be applied to A, and removed from it at pleasure. C is the queen-trap, which consists of a small square box, having a lid, $a$, secured to it by hinges, and provided with an opening covered with wire-cloth, $b$. In the bottom, $c$, of the box there is an opening, $d$, to fit over an opening, $e$, in the top of the hive A.

By placing a few pieces of comb in this trap, when thus placed, (see fig. 1,) which is done after the swarm is hived, the queen will be induced to enter it in a short time, say an hour or so. The trap is then cut off from the hive A by means of slides $f$, and is removed to the house, or carried in any close compartment, and the queen allowed to escape, together with the bees which were entrapped with her. The queen is then caught most generally flying to a light of glass in a window, from which she can be readily picked off, and is confined in a small wire cage, D, (see fig. 2,) which is placed over the opening $e$ in the top of the hive, where the trap was previously placed. The queen, thus confined, will be fed by the bees within the hive, and will be kept warm by the animal heat escaping therefrom.

The bees will commence at once to make comb, and as the queen is not at liberty to deposit her eggs in the cells, they are filled with honey, and having no brood to feed, the bees carry very little bee-bread into the hive. The bees, therefore, concentrate their whole force in constructing comb and gathering honey, and in a few weeks will fill a hive of a capacity sufficient to hold from seventy-five to a hundred pounds of honey, which is worth double the product of the swarm in any other way.

When the hive is filled, the caged queen can be removed, and placed in an empty hive in the same position.

The bees will search and find her out, and enter and work in the new hive, leaving the filled one to be removed by the apiariast.

The bees in the new hive, if not too much reduced by their former labor, will, by giving their queen her liberty, still breed a good colony for a stock-hive the next season.

Having thus described our invention, we claim as new, and desire to secure by Letters Patent—

The combination of the queen-trap and cage with the hive, substantially as described for the purpose specified.

A. J. SMITH,
              H. C. REED.

Witnesses:
 B. B. GREENE,
 G. L. SCOFIELD.